United States Patent [19]
DeFreitas et al.

[11] Patent Number: 5,689,949
[45] Date of Patent: Nov. 25, 1997

[54] IGNITION METHODS AND APPARATUS USING MICROWAVE ENERGY

[75] Inventors: Dennis M. DeFreitas, Oxford, N.Y.; Timothy W. Darling, Los Alamos, N. Mex.; Albert Migliori, Santa Fe, N. Mex.; Daniel E. Rees, Los Alamos, N. Mex.

[73] Assignee: Simmonds Precision Engine Systems, Inc., Akron, Ohio

[21] Appl. No.: 463,834

[22] Filed: Jun. 5, 1995

[51] Int. Cl.$^6$ ............................................. F02C 7/26
[52] U.S. Cl. ................ 60/39.06; 60/39.821; 219/121.36
[58] Field of Search ........................ 60/39.06, 39.36, 60/39.821; 219/121.36

[56] References Cited

U.S. PATENT DOCUMENTS

| | | | |
|---|---|---|---|
| 5,257,500 | 11/1993 | Venkatamani et al. | 60/39.821 |
| 5,361,737 | 11/1994 | Smith et al. | 123/143 B |
| 5,367,869 | 11/1994 | DeFreitas et al. | 60/39.06 |
| 5,414,235 | 5/1995 | Lucas et al. | 219/121.43 |
| 5,442,907 | 8/1995 | Asquith et al. | 60/39.06 |

OTHER PUBLICATIONS

CIRA White Paper, RF Quarter—Wave Coaxial Cavity Resonator, Plasma Ignitor, Jul. 1995, pp. 1–4.
Brooke, "Plasma Ignition Returns," Automotive Industries, Feb. 1992, pp. 121, 122 and 124.

*Primary Examiner*—Charles G. Freay
*Attorney, Agent, or Firm*—Leonard L. Lewis; William E. Zitelli

[57] ABSTRACT

An ignition apparatus for a combustor includes a microwave energy source that emits microwave energy into the combustor at a frequency within a resonant response of the combustor, the combustor functioning as a resonant cavity for the microwave energy so that a plasma is produced that ignites a combustible mixture therein. The plasma preferably is a non-contact plasma produced in free space within the resonant cavity spaced away from with the cavity wall structure and spaced from the microwave emitter.

15 Claims, 7 Drawing Sheets

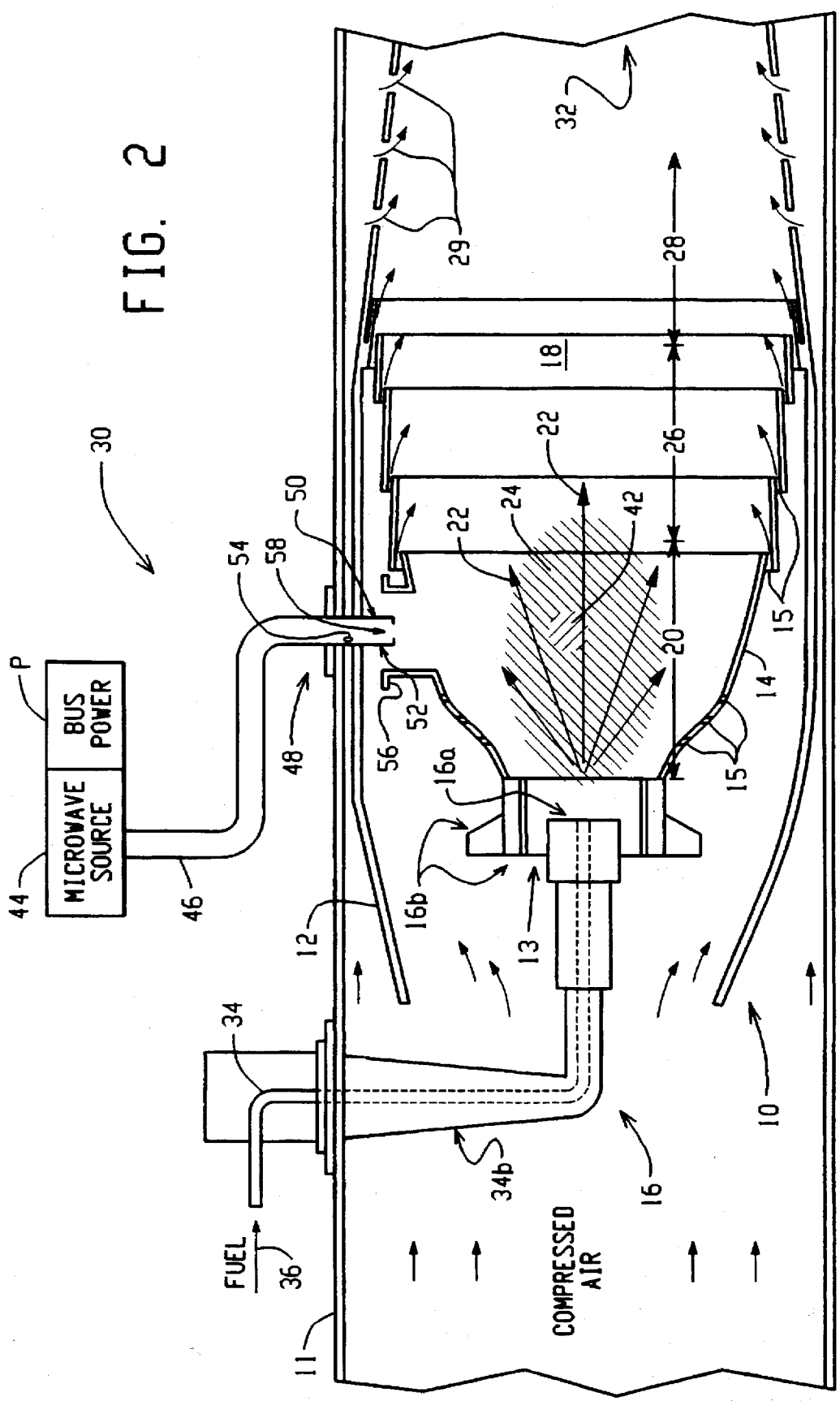

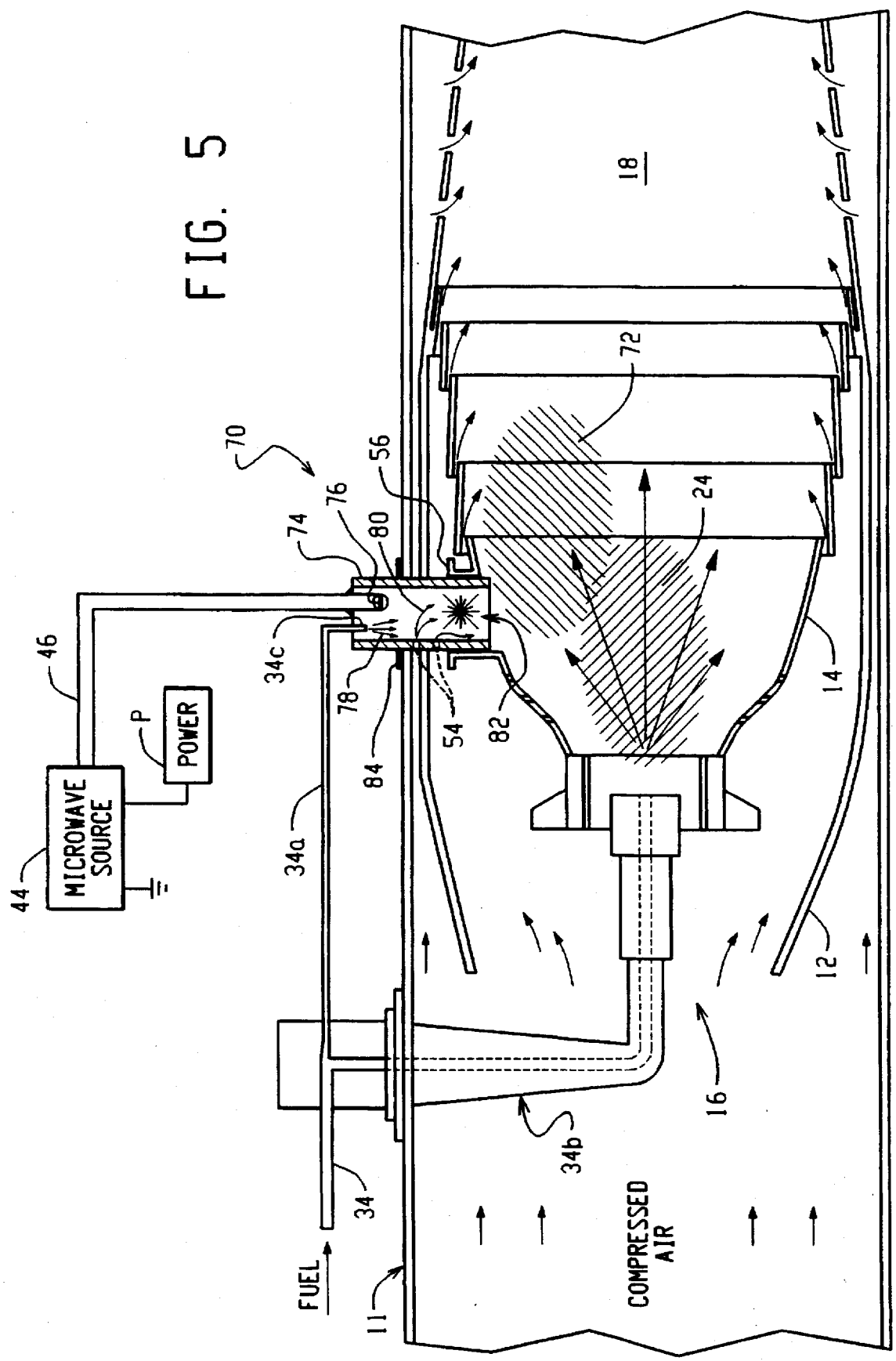

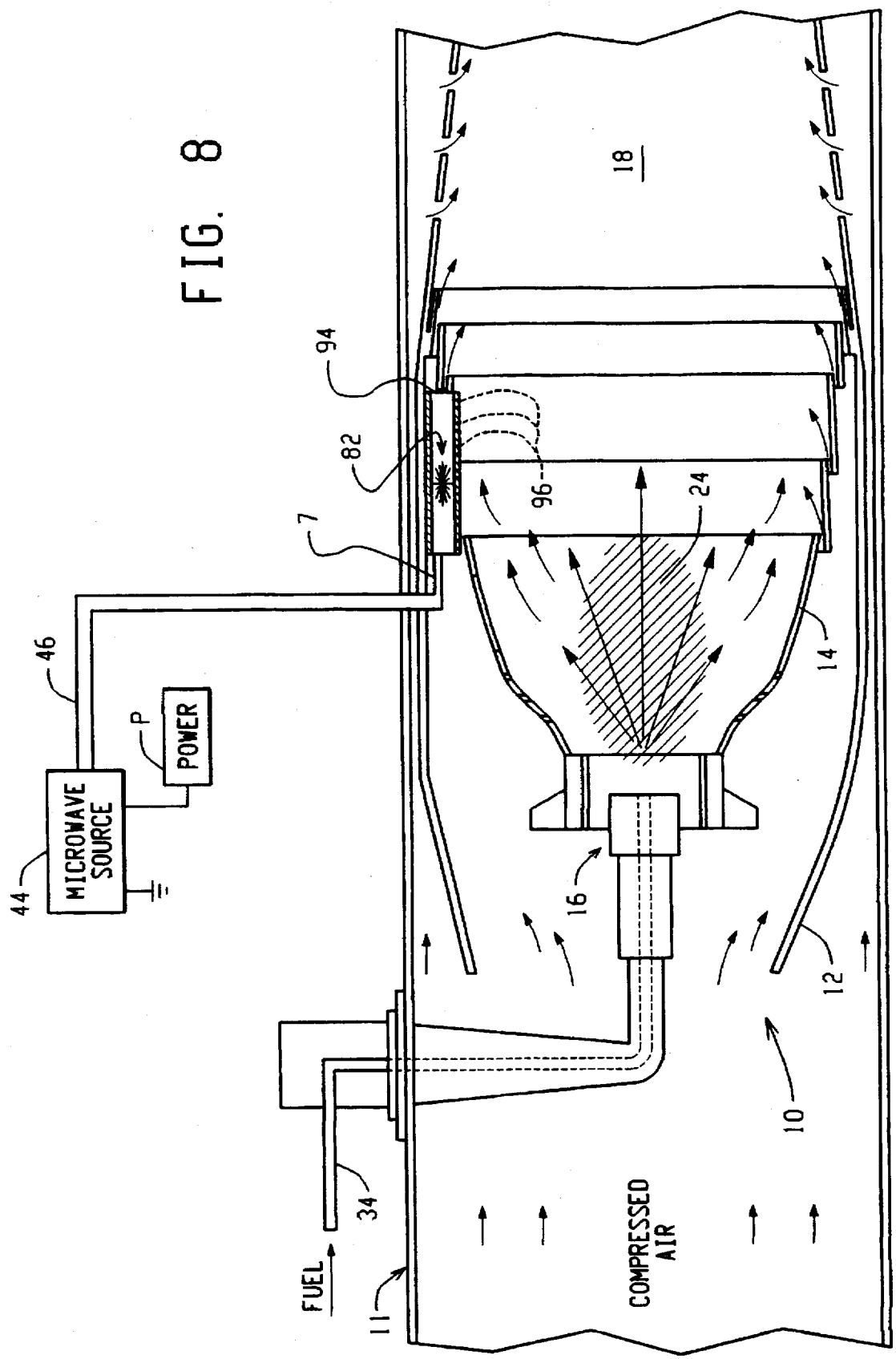

IGNITION METHODS AND APPARATUS USING MICROWAVE ENERGY

BACKGROUND OF THE INVENTION

The invention relates generally to igniting combustible material in a combustor. More particularly, the invention relates to ignition methods and apparatus for combustors using microwave energy.

A combustor is a fundamental assembly used to confine combustion of a fuel within an engine. For turbine engines, such as for example gas turbine aircraft engines, the combustor typically includes an open ended can or other annular casing that forms part or all of a combustion chamber for the fuel. A single engine may include a number of can combustors, or a single annular combustor, for example. Engines may also include combustors such as preburners and afterburners. Other engine types of interest include rotary engines, reciprocating engines such as, for example, automotive applications, and rocket engines, ram jet engines and pulse jet engines.

Within a combustor are one or more fuel nozzles which deliver fuel to the combustion chamber, along with air vents for delivering high velocity air to the combustion chamber. The air/fuel mixture is ignited typically in or near the region of the combustor closest to the fuel nozzles (i.e. the primary zone). The combustion process continues as the combusting fuel/air mixture moves down to the intermediate zone where additional air is supplied to cool the combustor wall and aid the combustion process. The process continues as the mixture of hot combustion gases enters the dilution zone where dilution air is supplied to cool the exhaust gases to protect the annulus casing from melting and downstream to protect the turbine blades. As is well known, homogeneity of the fuel burn within the combustion chamber is an important design criteria for a turbine engine.

Fuel delivery systems play an important part in the ability to initiate or restart a turbine engine. In known combustors, the fuel nozzles typically include a primary orifice and one or more secondary orifices. The purpose of the nozzle primary orifice is to provide initially a finely atomized fuel spray that can be ignited for engine start. After combustion starts and the engine speed increases, the secondary orifices are opened to increase fuel flow.

The ease with which fuel can be ignited in the combustor depends on several key factors including fuel temperature, the type of igniter used, amount of ignition energy delivered, the air/fuel mixture ratio (for example, lean or rich mixtures), the point of ignition energy delivery and the degree to which the fuel is atomized by the nozzle via the primary orifice. The atomization process is also important with respect to the overall efficiency of the fuel combustion.

Combustors require an igniter device to initiate the combustion process. Known igniters include plasma type spark plugs and glow plugs. More recently, laser energy, particularly infrared laser energy, has been incorporated into an igniter, as disclosed in U.S. Pat. No. 5,367,869 issued to DeFreitas.

In the case of a spark plug, the spark plug typically is mounted in the combustor wall near the fuel nozzle. In a conventional combustor, the primary zone or optimum region for ignition is the high turbulence region just forward of the nozzle outlet. However, an igniter typically does not protrude down into this optimum region because it would be destroyed by the fuel combustion process. Retractable igniters are sometimes used with furnaces, but are not deemed reliable for aerospace applications. Thus, particularly in aircraft engine combustors, the igniter is mounted in a recess on the wall of the combustor near the primary zone. A high energy plasma, high temperature spark kernel is created at the periphery of the combustor wall. This spark kernel typically protrudes about one-quarter inch into the combustion chamber, and initiates a quantity of fuel and air to form a flame kernel. However, the combustor wall tends to act as a heat sink and quenches the flame kernel. Only flame kernels of sufficient volume can overcome this initial quenching. The fuel/air mixture also may not be optimum in this region. Obviously, combustors are designed so that this type of ignition arrangement works, but it is less than ideal.

A known alternative to the spark kernel is the use of a torch burner which creates a flame that is used to ignite the main fuel supply in the primary zone of the combustion chamber. Known torch burners, however, still produce less than ideal results because of their reliance on conventional fuel supply nozzles and orifices, as well as use of spark plug igniters.

Conventional plasma type spark plugs are commonly used for igniters. They inherently use high voltage/current contact plasma discharge, and as such they can exhibit electrode degradation and are routinely replaced.

With any new ignition system for turbine engines, particularly engines that will be designed for aircraft, it is desirable that the ignition system design not dictate or otherwise restrict the combustor design criteria. It is desirable, for example, that the ignition apparatus remain outside the combustion chamber. Furthermore, new ignition systems would preferably be readily adaptable as a retrofit or direct replacement for conventional ignition systems that use spark or glow plugs, without the need to modify the existing combustor design.

The objectives exist, therefore, for a better and more reliable and more efficient apparatus and methods for initiating, sustaining and/or restarting combustion in a combustor. This includes providing an improved igniter that does not have the problems associated with conventional plasma type spark plugs and glow plugs. As a practical matter, such an igniter and ignition system should be capable of a direct substitution or replacement for existing igniter arrangements so as to minimize or eliminate the need for combustor designers to redesign the combustors that will use such a new system and to facilitate use of the ignition system for retrofit and system upgrades.

SUMMARY OF THE INVENTION

The present invention contemplates a significant departure from conventional combustion ignition systems by providing in one embodiment, an ignition apparatus having a combustor and a microwave energy source for emitting microwave energy into the combustor at a frequency close to or at a resonant response of the combustor to produce a plasma. In another embodiment, the invention is realized in the form of a flame injector for igniting a combustible mixture in a combustor, the flame injector having a resonator cavity, means for introducing a combustible mixture into the cavity, and a microwave energy source for emitting microwave energy into the cavity at a frequency within a resonant response of the cavity to produce a plasma that ignites the combustible mixture.

The invention also contemplates methods for igniting combustible material in a combustor as embodied in the use of such apparatus, as well as in another embodiment, an ignition method including the steps of:

a. introducing a combustible mixture into a combustor;

b. producing microwave energy and directing the microwave energy into the combustor; and c. using the combustor as a resonator for the microwave energy to produce a plasma in the combustor to ignite the combustible mixture.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 2 is a schematic diagram in partial section of a gas turbine engine combustor with the invention incorporated therein;

FIG. 5 is a schematic of another embodiment of the invention for a combustor ignition apparatus using the combination of a microwave igniter with a flame injector;

FIGS. 7 and 8 are schematics of other embodiments of the invention; and

DETAILED DESCRIPTION OF THE INVENTION

Figure 1:
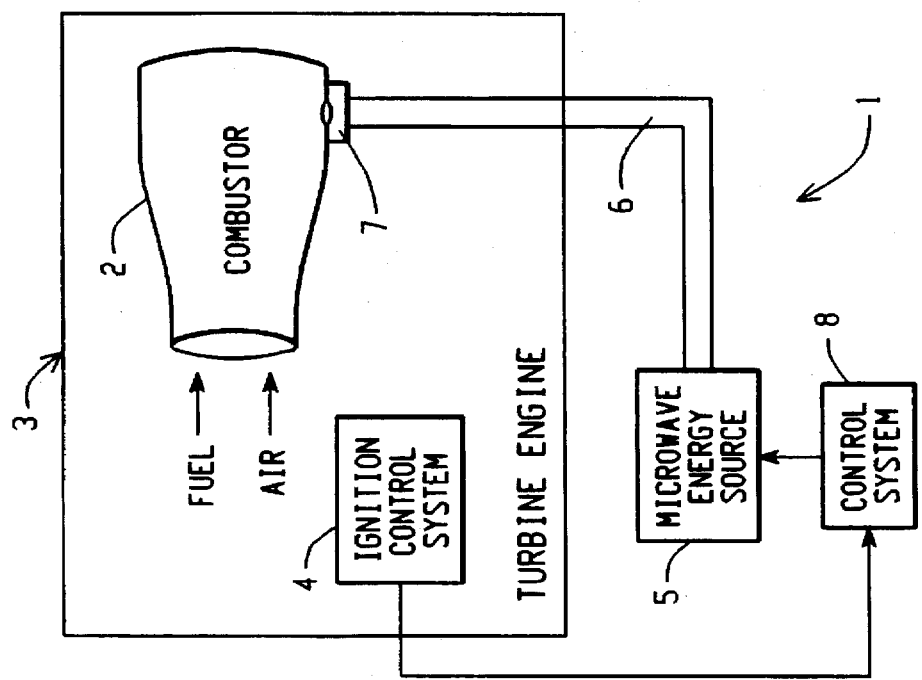
FIG. 1 is a simplified block diagram in schematic form of the basic elements or building blocks of an embodiment of the invention.

With reference to FIG. 1, an embodiment of the invention is illustrated in simplified schematic form for purposes of describing the basic concepts of the invention. In this basic configuration, an ignition apparatus 1 is provided for one or more combustors 2 disposed in a gas turbine engine 3. It is important to note that while the various embodiments of the invention as described herein are particularly directed to or explained in the context of use with gas turbine engines such as are commonly used for aircraft, such descriptions are intended to be exemplary in nature and should not be construed in a limiting sense. The invention is related to combustion initiation, maintenance and restart processes, rather than being limited to specific engine or combustor designs or applications. Those skilled in the art will readily appreciate that the invention can be used with different types of combustors for many types of engines and applications other than in the aerospace and airborne gas turbine applications. For example, the present invention can be applied to combustors for reciprocating and rotary engines, rocket engines particularly liquid fuel rockets, ram jet and pulse jet, to name just a few examples. A few gas turbine engine applications of interest are: jet engines including preburners, afterburners for engines, turbojets, turboprops, turbofans, large gas turbine, medium gas turbines, small gas turbines, marine gas turbines, stationary and mobile industrial gas turbines. Other combustor systems of interest are: residential and industrial furnace applications, can combustors, can annular combustors, annular combustors and dual annular combustors to name a few. As noted, the invention is also applicable to reciprocating and rotary engine applications, such as, for example, automotive applications, an embodiment of which is illustrated and described with reference to FIGS. 9A and 9B. Thus, various embodiments are provided herein for applying the concepts and teachings of the invention to combustors that have a fixed geometry during a combustion cycle, such as a turbine can combustor, and combustors that have a variable geometry during the combustion cycle. For example, a reciprocating engine cylinder in an automobile has a volume that changes with the piston stroke.

These examples of combustors and engines are not intended to be exhaustive, of course, nor are they to limit the scope and application of the invention.

Accordingly, the term "combustor" as used herein should be construed in its broadest sense to include any structure that defines or delimits a combustion chamber, such as the examples identified above, wherein fuel combustion is initiated, sustained and/or restarted. This includes the concept of a secondary or auxiliary combustor, such as can be used with a flame injector as described herein, or as a plasma injector, for example, as also described herein, for initiating combustion in a second or main combustor. The invention, it should be noted, is especially useful with flow through combustors. Flow through combustors are generally understood as combustors in which the combustion process is continuous and characterized by an uninterrupted flow through velocity which may accelerate or decelerate due to gaseous expansion or contraction but generally is not interrupted by valves, throttle plates or similar devices. Flow through combustors are further characterized by relatively high air flow rates through orifices without throttling devices to produce a highly turbulent mixing of combustion air and fuel.

With continued reference to FIG. 1, a turbine engine typically includes an ignition control system 4 which may include various electronic circuits such as an exciter for controlling when ignition is to start or re-started. An exciter periodically provides a high energy discharge (usually capacitive or inductive) to a conventional spark plug which creates a spark or plasma that ignites an air/fuel mixture in the combustor 2. The ignition control system 4 further may include various monitoring and input functions to enhance ignition performance, as is well known to those skilled in the art.

The present invention, however, departs dramatically from the conventional spark plug or glow plug igniter (including the use of an exciter circuit), and replaces them with what can be generally referred to as a microwave igniter or microwave based ignition system. By "microwave igniter" is simply meant the application of microwave energy to initiate combustion by the creation of a plasma either in the combustion chamber or a plasma that can be injected or delivered to the combustion chamber, or a plasma that can be exposed to a combustible mixture associated with or in the combustion chamber. These various embodiments will be described in greater detail hereinafter. The microwave igniter concept is generally illustrated in FIG. 1 by the provision of a microwave energy generator or source 5 and a microwave transmission device 6, such as for example a wave guide, that is used to couple microwave energy from the source 5 to a microwave emitter 7 at an opening to the combustor 2. The microwave source 5 can be conventional in design, even as basic as a commercially available magnetron. The microwave source will include a control system 8 that will activate the microwave source 5 in response to appropriate input or command signals from the ignition system 4. The specific designs of the control systems 4 and 8 will be determined in large measure by specific application requirements, but still can be conventional in nature well known to those skilled in the art and as such need not be described in detail herein to fully appreciate, understand and practice the invention. For example, these control systems can be realized in the form of digital signal processors, microprocessors, microcontrollers, analog circuits and digital circuits to name a few. Accordingly, the invention is generally directed to the application of the microwave energy to achieve combustion or ignition for the combustor 2. In general terms, the generator 5 and transmission device 6 and emitter 7 can collectively be referred to as a microwave source for emitting microwave energy into the combustor 10 (or any resonant cavity as will be apparent hereinafter) at a frequency within a natural resonant response of the combustor.

According to one aspect of the invention, the use of microwave energy to initiate combustion is realized by using a component of the engine, in the example described herein, the combustor inner liner, as a resonant cavity. This aspect of the invention thus is based on the appreciation that the combustor liner exhibits a number of natural resonant frequency responses for the microwave energy. Microwave ignition takes place then by emitting microwave energy into the combustor at a frequency at or near one of the natural resonant responses to create an intense and highly localized electric field that produces a plasma within the combustor. The intense electric field is produced as a result of the resonance of the microwave energy within the combustor. This phenomenon can be thought of as a three dimensional field mode for the resonant energy, with near zero electric field near the walls of the combustor (and advantageously near the microwave emitter) and the electric field building to a maxima near the center of the combustor. The present invention advantageously is not limited to the use of any particular mode, but rather the mode and frequency are selected, based on modeling the combustor, that produces a resonant response to locate the created plasma at or near a desired location, such as for example just forward of a fuel nozzle.

When the electric energy field intensity equals or exceeds the breakdown intensity required for the combustor gases (typically air), a high temperature and stable plasma is created approximately near the center of the combustor. Although breakdown of air generally requires very intense electric fields and thus high input power requirements, the resonant behavior of the combustor produces a significant amplification of input power so that relatively low average power microwave sources (such as are commercially available in radar systems and microwave communications, for example) can be used to initiate combustion.

It is a significant advantage of the invention that the plasma can be produced if so desired in free space away from the combustor walls and the microwave emitter. This generally non-contact type plasma reduces substantially thermal quenching effects. With the plasma spaced from the combustor wall structure, the plasma does not erode or otherwise effect the structure. Having the plasma also spaced from the microwave emitter helps lower the thermal exposure to the microwave emitter.

Another significant advantage of the invention is that, because the invention makes use of a combustor natural resonant response, the microwave ignition technique can be used in place of conventional ignition systems without any significant modification to the existing combustor design. In other words, a microwave igniter can be easily adapted to the existing combustor rather than having to modify the combustor to work with the igniter. This greatly enhances the availability of this technique for retrofit, because combustor designs are very complicated as to fuel/air flows and operation to maintain combustion and a stable efficient burn. However, modification of a combustor design is not precluded in order to practice the present invention.

Recognizing, however, that combustor designs are quite varied from engine to engine, in accordance with another aspect of the invention, an auxiliary combustor or resonant chamber can be provided that has a fixed and predetermined resonant response or signature independent of its use with different combustor designs. This secondary or auxiliary combustor can be incorporated into the existing combustor design without significant modification of the latter. This permits advantageously a single or standard microwave source to be used with a number of different engine designs, thus realizing the inherent advantages of larger scale production, including the availability of commercially available microwave sources to be used with the invention.

It is important when reading the description herein to recognize that the terminology should not be construed so as to limit the scope or application of the invention. This has already been noted hereinabove with respect to the term "combustor". As further clarification, for convenience the term "combustor" herein will generally refer to any structure having a combustion region or chamber in which a combustible mixture, in the examples herein air and a fuel, is ignited by contact with or exposure to a microwave generated plasma.

The term "resonant cavity" is generally used herein to refer to any structure defining a region in which an electric field enhancement exists over the electric field in the transmission line driving it. In accordance with the invention, such a resonant cavity is used to produce such an electric field with an intensity sufficient to produce a plasma (by any technique such as breakdown, ionization and so on), whether or not exposed to or in the presence of a combustible mixture. This electric field builds up in the resonant cavity as a result of microwave energy being emitted into the cavity at a frequency that is at or near a natural resonant frequency response of the cavity. For cases where Q is reasonably high (about 10 or higher, for example), a resonant response exists where the cavity exhibits a substantial dissipative component to its impedance while well off resonance the exhibited impedance is primarily capacitive or inductive.

Thus, the term "resonant cavity" is intended to include broadly the use of an existing combustor geometry to produce microwave resonance within a natural resonant response of the combustor. The concept of a resonant cavity as it pertains to the present invention does not preclude the availability of designing a combustor to have a desired resonant response. Furthermore, a combustor used as a resonant cavity can have a resonant response that is inherent in its design, or the cavity can be specifically designed for a desired response, either case being useful with the present invention. The present invention advantageously permits the designer flexibility in selecting a natural resonant response and thus simply providing a microwave source and wave guide to effect the resonant response, rather than having to design a combustor or cavity to operate with a specified microwave source (the latter case still being an available option if so desired).

Additionally, the term "microwave" as used herein is intended to broadly cover a wide range of radio frequency electromagnetic energy beyond that which may otherwise be considered in different disciplines as specific frequency ranges for microwave applications. The term "microwave" is used herein because generally the frequency range useful for many applications will fall within the 1 Gigahertz to 100 Gigahertz range. However, the selected frequency will be determined in large part by the natural resonant frequencies of the selected resonant cavity, and thus may well fall within or below the lower radio frequencies of 400 Megahertz to 1 Gigahertz (for larger combustors or resonant cavities, for example), or on the high end beyond 100 Gigahertz. Thus, for convenience the term "microwave" herein should be broadly construed as radio frequency energy produced at such frequency corresponding to or within a natural resonant response of a resonant cavity or combustor (as determined for each application).

Furthermore, the term "plasma" is intended to broadly cover any high energy, high temperature region produced or formed in air or other medium such as by, for example, electrical breakdown or ionization or otherwise, and also refers to a flame or combustion of a combustible mixture, which plasma can be used as an ignition source for a second combustible mixture. Such plasma may or may not be characterized by a visible or invisible "flame" as such. Experiments have indicated that a plasma formed in air by microwave energy appears as a localized plasma ball of high intensity and very high temperature. The plasma can be displaced, beyond its point of initiation as with any plasma, such as by high velocity air movement, magnetic or electromagnetic plasma acceleration effects, to name just a few examples.

In the embodiment of the invention in which a combustor is used as a resonant cavity, the basic principles of operation are as follows. A microwave resonant cavity is an electrical resonator having a number of resonant responses each of which is characterized by a "Q" or quality factor and by a corresponding resonant frequency "f". In the case of a combustor, which may have any number of irregular shapes or geometries, the combustor will have a characteristic frequency response or signature in which it may exhibit one or more resonant frequency spectra. Typically, the lowest resonant frequency response will be selected, but this is not a necessary requirement for practicing the invention. Also, the quality factor, Q, may be higher or lower for different resonant response regions. The value of Q for a particular resonant response will determine in part the amount of peak and average input power required initially to be applied to the combustor. Although preferably a microwave source will be used that produces microwave energy at the resonant frequency of the cavity, those skilled in the art will appreciate that the Q value and resonant response may in some cases permit ignition (plasma formation) to take place "off resonance", i.e. at a frequency near but not necessarily at the resonant frequency of the cavity.

Thus, the invention should be understood as involving the use of microwave energy at a frequency that is within a natural resonant response of the cavity, and preferably at or near a resonant frequency, such that resonant Q amplification occurs to the point of producing a plasma in the cavity.

With the resonant cavity being characterized by its Q and f for each of its resonant responses, if microwaves at a frequency within one of these resonant responses are weakly coupled into the cavity, then the energy of the microwave field builds up inside the cavity with a characteristic time approximately equal to $Q/\pi f$. The energy density in the cavity is approximately equal to Q times the energy density in the transmission line 6 (e.g. a wave guide or coaxial cable) used to feed the cavity. The electric field in the cavity is approximately equal to the square root of Q times the electric field in the transmission line. For example, a combustor with a Q=1000 at 2.4 GHz would have about thirty times higher electric fields than in the transmission line. Furthermore, because in a microwave cavity the electric field parallel to the walls is zero and the electric field perpendicular to the walls can be made zero by appropriate choice of modes (as provided by the modeling code as described hereinafter), the most desirable modes produce the maximum electric field away from the walls with a maximum near the middle of the cavity.

Operation occurs when the electric field in the combustor or cavity reaches levels sufficient to ionize the gases in the resonant cavity (typically air is the primary gas but this need not always be the case). The higher the altitude (i.e. pressure effects), the lower the electric field needed for breakdown (as is known from Paschen's Curve).

Because a continuous discharge is typically not required, the microwave source can be pulsed. The duration of the pulse can be as short as the cavity decay time $Q/\pi f$. In a typical can combustor, this time may be on the order of 0.1 microseconds. Preferably, the applied microwave pulses will be for a time period substantially longer than the cavity decay time. Thus, for example, if the cavity is pulsed 10 times a second for 1 microsecond per pulse (to produce 10 plasma flashes or breakdowns per second) for a total of 10 microseconds of applied microwave energy, the duty cycle is 1 in 100000, so that a typical 400-700 watts average power magnetron can produce on the order of 5 megawatts peak power pulses. Those skilled in the art will appreciate that some magnetrons may require cooling to produce these high peak power but short duration pulses. Furthermore, within the resonant response regime, microwave energy loss from an open ended combustor is minimal because conditions are such that the radiation from the open end of the cavity is strongly attenuated. Furthermore, this weak energy is absorbed in the interior of the engine. Thus, the combustor acts, in effect, as an open ended microwave resonator.

When the microwave source is pulsed and plasma formation occurs, the plasma itself (which is highly conductive) may be considered to be very similar to a conductive volume for purposes of modeling the combustor microwave resonant response with a plasma present. The plasma, therefore, detunes the cavity, naturally shutting off the microwave power able to couple into the combustor, thereby acting as a self-limiting feature.

Having described the fundamental concepts of the invention, various exemplary embodiments thereof will now be described.

With reference to FIG. 2, a typical combustor 10, such as may be used with a turbine engine, includes within a fan casing or air plenum 11 an outer combustor liner 12 that encloses a combustor inner liner 14. For clarity and convenience, only one combustor is shown in FIG. 2. Other combustor designs, of course, could be used and include, for example, annular combustors which would typically have a plurality of fuel nozzles therein arranged in an annular somewhat doughnut-shaped configuration within the casing 12 (without the can design). The particular type of combustor used will depend on the engine design or combustion application. The invention is suitable for use with many different types of combustors, therefore, the description herein of a can combustor should not be construed in a limiting sense.

The combustor liner 14 is provided with a plurality of carefully designed air vents 15 that permit combustion air to enter the combustor and mix with fuel as is well known. Fuel is supplied by one or more fuel nozzle assemblies 16 installed through openings in the inner combustor liner 14. Typically associated with each fuel nozzle assembly 16 are additional air inlets 13 to create a high air flow and turbulence in the proximate area of the nozzle to facilitate air/fuel mixture and uniform combustion. Aerodynamic swirlers 166 have also been incorporated in liner 14 and/or fuel nozzle 16 to further enhance this effect. In the embodiment of FIG. 2, each fuel nozzle assembly 16 may be any conventional nozzle such as a fuel pressure nozzle, air blast nozzle, electrostatic nozzle or other type, and is usually specified by the engine manufacturer. The nozzle assembly 16 includes appropriate fittings that couple a fuel line 34 to the nozzle assembly in a known manner. The invention can be used with different fuels and fuel delivery systems, including liquid fuels (as exemplified in these embodiments), or natural gas to name just two examples.

The combustor inner liner 14 defines a combustion chamber 18 that includes three combustion zones, as is well known to those skilled in the art. The ignition or primary zone 20 is located just forward or downstream of the fuel nozzle outlet 16a. This primary zone is a region of high fuel concentration and high air flow, volume and turbulence. Fuel is preferably dispersed into the primary region as represented by the directional arrows 22 so as to provide an optimum area for combusting the fuel, as represented by the shaded region 24. The nozzle 16 preferably provides atomized fuel in the form of a small droplet spray. In accordance with an important aspect of the invention, a microwave igniter, generally indicated with the numeral 30, is provided to initiate the main fuel supply ignition process, as will be explained shortly hereinafter.

Just downstream of the primary zone is an intermediate zone 26. In this zone, dilution air (represented by the arrows near the openings and vents 15) is provided to the combustor through the air vents 15. This air is used both to facilitate a homogenous combustion and also to cool the combustor liner 14. After the intermediate zone the combustion by-products pass through a dilution zone 28 where further dilution air 29 is provided to cool the hot gases sufficiently before they pass through the combustor exit 32 to the turbine blades.

Each fuel nozzle 16 receives fuel from a nozzle fuel line 34 connected to a main fuel line 36. The fuel line 34 is coupled to the nozzle 16 by an appropriate fitting (not shown).

Mounted to the combustor 10 is the microwave igniter assembly 30 which is used to emit or couple microwave energy into the combustor to produce a plasma as at 42 preferably within the primary zone so as to ignite the fuel spray 24. The microwave energy is emitted into the combustor 10 and forms a three dimensional resonant field within the combustor, and under the described conditions produces the plasma discharge. In the embodiment of FIG. 2, the microwave igniter 30 includes a microwave energy generator system 44, which may be a conventional magnetron, for example, powered by the main system power supply P. Besides magnetrons, the microwave energy can be produced by alternative sources such, as klystrons or traveling wave tubes, to name a few more examples. By way of example, a suitable magnetron for use with the present invention is part no. MG5240 available from English Electric Valve, a UK subsidiary of General Electric. The microwave source selected will be determined in large part by the microwave frequency needed for a particular application.

Figure 3:
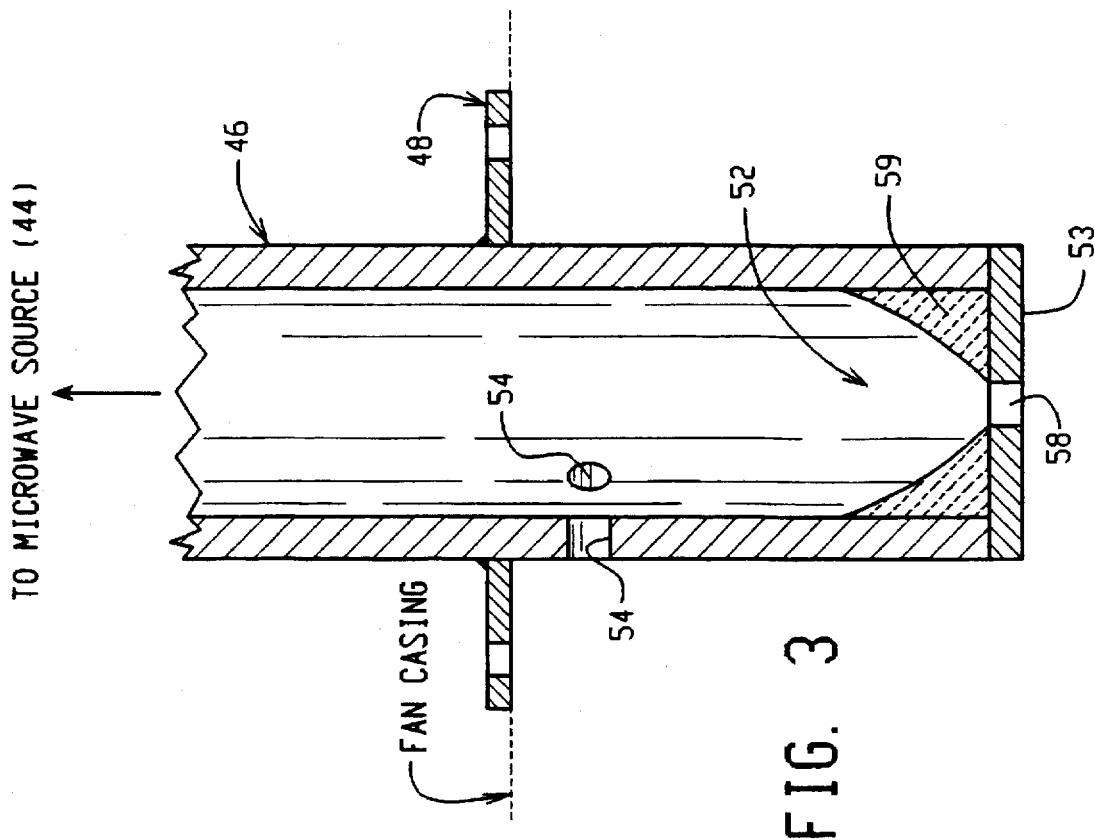
FIG. 3 is a detailed schematic of a mounting assembly for a wave guide to a combustor as in FIG. 2.

A microwave transmission device 6, in this example a wave guide 46 is coupled at one end to the microwave source system 44 Output, and is routed so as to have a distal end 52 disposed at or near an opening to the combustor 10. The transmission device could alternatively be a coaxial cable with an antenna emitter at the combustor 10 opening. The wave guide 46 can be conventional in design such as a rectangular hollow metal (such as, for example, stainless steel, hastalloy and others well known to those skilled in the art) walled conduit, or a cylindrical hollow metal walled conduit, or other suitable wave guide that can transmit the microwave energy produced by the source 44 to an opening in the combustor liner 14. In FIG. 3, the wave guide 46 is represented by the broken lines as being an extended wave guide that is connected to the microwave source 44. Those skilled in the art will appreciate that a long wave guide will in practice be constructed of a number of wave guide sections which can be connected or assembled together in any convenient manner suitable for microwave energy, as is well known to those in the art. Connection of the wave guide 46 to receive the microwave energy from the source 44 can be conventional in nature, well known to those skilled in the art.

In FIG. 2, the wave guide 46 enters the plenum 11 through a flanged opening 48 and extends through the outer and inner liners 12, 14 and can be attached to the flange 48 such as by welding. As shown, the wave guide 46 is provided with a number of air holes 54 which are open to the plenum air. Air thus can enter the wave guide 46 and pass down into the combustor through a slit 58. This arrangement prevents the creation of "hot spots" near the terminus of the wave guide, and also maintains a positive air pressure into the combustor 10 so that combustion by products do not escape through the liner opening or up into the wave guide 46. The air holes 54 provided in the wave guide 46 should be appropriately sized so that microwave energy does not pass through the holes.

Figure 4:
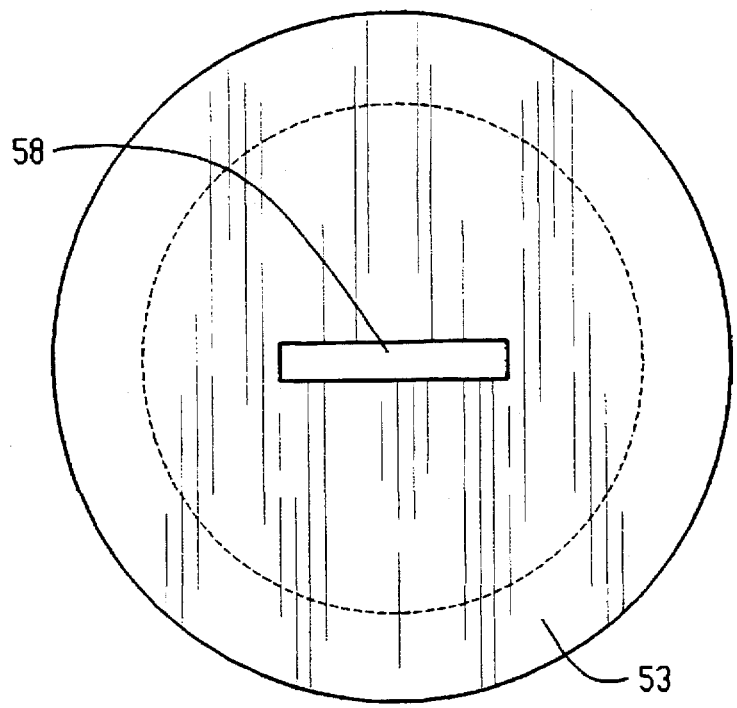
FIG. 4 is an end view of the assembly of FIG. 3.

With reference to FIG. 3, more detail of the wave guide termination is illustrated. The wave guide 46 is attached to the flange assembly 48 by any convenient means such as welding, threaded engagement or other suitable means. The wave guide 46 passes through the flange and terminates at a metal face plate 53. The plate 53 may be made of metal, for example and as illustrated in FIG. 4 includes a slit 58. A metallic filler material 59 can be placed at the wave guide 46 emitter end to help purge particles in the wave guide 46 if needed. As an alternative embodiment, the slit 58 can be sealed with a microwave transparent ceramic or other suitable material. In such a case, the air holes 54 can be omitted from the wave guide. In the present embodiment of the invention, the wave guide 46 is used to transmit the microwave energy to an opening 56 in the combustor liner. As shown in FIG. 2, this opening can conveniently be, for example, the spark plug opening 56 (the spark plug having been removed), assuming that the existing spark plug hole 56 is a suitable location for the wave guide terminus end 52. If the design necessitates a different location for the wave guide, then another opening to the combustor can be used or provided and the spark plug hole can be sealed off.

The slit 58 functions as an iris coupler to emit the microwave energy into the combustor chamber 18. Alternatively, a loop antenna could be used as a microwave emitter at the end of a coaxial cable to emit microwave energy into the combustor 10. Either arrangement can be used to realize the emitter 7 (referenced with respect to FIG. 1). All these options and others are well known to those skilled in the art for emitting microwave energy from a source 44 into a cavity or free space.

The size and geometry of the slit 58 affect the strength of coupling of the microwave energy into the combustor 10.

Typically, the smaller the slit the weaker is the coupling so that greater Q amplification is achieved. So long as the slit is not disposed at a resonant dead spot of the combustor 10 (the nodes are obtained from the microwave modeling code), the microwave energy is coupled into the combustor 10 and when the microwave frequency is within a resonant response of the combustor 10, resonance will occur and substantially increase the electric field intensity therein.

The position of the wave guide microwave emitter 7 (in this-example the iris coupler 58) can be selected based on the resonant signature of the combustor 10 as well as other factors. For example, in some cases it may be desirable to locate the microwave emitter 7 downstream from the primary zone, in the cooler region of the secondary zone or the dilution zone. This is available because the system operates to create the plasma ball 42 in free space so as to ignite the combustible mixture.

In operation, during engine start, running or restart, fuel and air are delivered to the combustor via the nozzle 16 and the plenum 11. Preferably during start-up, air is delivered first and after the plasma 42 is created or coincident therewith fuel may be delivered into the combustor 10. In this manner, uncombusted fuel is not sprayed into the combustion chamber 18. When the ignition control system commands start, power is applied to the microwave source 44, which generates microwave energy at a frequency selected to be within a resonant response of the combustor 10. It is worth noting at this time that a designer can select different engine components for the resonant cavity. In the example herein, the combustor inner liner assembly 14 is used to provide the resonant cavity. Alternatively, the outer liner 12 or the fan casing 11 could be used to establish resonance to produce a plasma near the primary zone, and can be displaced into the combustion chamber 18 through the holes 15 by the compressed air flowing through the plenum 11. There is no particular restriction on what part of the engine is used for the resonant cavity, assuming that the plasma 42 is present inside or enters the combustor 10, or can otherwise be exposed to the combustible mixture therein.

In the embodiment of FIG. 2, the microwave energy resonates inside the combustor 10 so as to build up in a relatively short period of time (microseconds or faster) a highly intense and concentrated electric field near the longitudinal axis of the combustor 10. When the electric field has built up to the point of breakdown of the gas air) in the combustion chamber 18, a high energy, high temperature plasma 42 is produced, akin to a ball of plasma, and this plasma ball ignites the combustible mixture in the combustion chamber 18.

When the plasma ball 42 is created, energy flow from the emitter 7 into the combustor 10 effectively ceases because the plasma "detunes" the combustor, at least with respect to the applied frequency of the emitted microwave energy. As a function of the combustor Q value and plasma parameters such as temperature, gases, ionization energy and so forth, the plasma 42 dissipates and when it is extinguished the emitted microwave energy resonates and builds again to another discharge. In this manner, for all practical purposes, a continuous plasma igniter is realized with the use of microwave energy. The plasma 42 is produced in free space, substantially spaced from the combustor 10 liner and the emitter 7 because the electrical field intensity for the mode chosen is made to be zero at the combustor boundary, and at a maximum near the combustor center axis, and further the plasma can be positioned ideally downstream from the fuel nozzle. In some applications, the combustor 10 can be modified if needed to position the plasma at a desired location, again as determined by the microwave modeling code. In most cases, though it will be preferred to select the mode that produces a useful plasma without having to change the basic combustor design. This entire arrangement can be realized despite the apparent irregular geometry of a typical combustor 10, by appropriate selection of the mode and microwave energy frequency to be within a resonant response of the combustor 10.

In designing a microwave ignition system according to the present invention, several design factors are taken into consideration. First, the gas present in the resonant chamber of which breakdown will occur is identified. In a combustor, for example, this gas typically will be air. Paschen's Curve, available in any number of texts, provides the electric field intensity needed to create a plasma in the selected gas as a function of the gas pressure. For example, a designer might select the worst case pressure at which ignition is to occur, and design the ignition system to provide enough power for breakdown at that pressure. Alternatively, the control system for the microwave source can be designed to provide a controlled power level from the source 44 so that different intensity levels are produced depending on the sensed operating pressure at the time ignition is to occur. In the case where the wave guide 46 is open to the combustion chamber 18, pressure can be sensed by simply measuring wave guide pressure.

Next, a microwave transmission device 6 is selected for the microwave source 44, such as a tubular wave guide 46 or coaxial cable, for example. With these selections made, the structure that is to serve as the resonant cavity is selected. In this example, the structure is the combustor inner liner 14. An approximate model of the resonant response of the cavity is made using a microwave modeling code. Any one of commercially available microwave modeling codes can be used. A particular code that is suitable for practicing the invention is THE HIGH FREQUENCY STRUCTURE SIMULATOR available from Hewlett-Packard Corporation. This code provides the approximate range of positions for resonance at which to place the microwave emitter 7 at an opening to the structure, as well as the different operating modes available and the characteristics of the resonant fields associated with each mode. Precise positioning of the emitter 7 is not critical so long as the emitter 7 is not positioned right at a dead zone or node of the resonant response. For each resonant cavity structure, empirical data can also be used to determine optimum locations for the emitter 7 as well as the size of the slit 58.

From the known electric field intensity required for breakdown, the required energy density can be calculated needed to create that field. A network analyzer, such as an HP 8753 analyzer available from Hewlett-Packard, can be used to precisely measure the Q value and the resonant frequency of the resonant cavity structure. In the case of combustors, such cavities will typically exhibit a number of resonant frequency responses with corresponding Q values. The network analyzer also provides the real and complex components of the impedance for the wave guide 46 and the microwave energy source 44. The slit 58 iris coupler (or alternatively an antenna or other emitter) geometry can then be designed to provide an efficient coupling of microwave energy from the wave guide 46 into the combustor 10, more specifically, the inner liner 14. As a general design criteria for large slits, the smaller the slit 58 is made, the higher the coupling efficiency and hence the longer the build-up time (or alternatively the lower the input power required to be emitted from the wave guide 46) because the Q value is higher. But there is a practical limit on the minimum size of the slit 58 (which will be application specific for each combustor 10) due to losses in the combustor wall structure. The metallic wave guide 46 and iris coupler 58 provide a unique design opportunity to use the wave guide as a fuel supply, and the iris coupler can be sized to function as, or provide a fuel input to, a fuel nozzle, because the fuel will be transparent to the microwave energy. This will be further described hereinafter.

The Q of the resonant cavity can be used to calculate the peak power needed to create a plasma breakdown of the gas in the resonant cavity. Q can be defined as $2\pi$ times the ratio of the energy stored in the resonator over the energy lost per cycle. Q is a measured known quantity, and the numerator is determined by the energy required to initiate a plasma. Consequently, the power lost per cycle can be calculated and from that value the energy required in the cavity is determined. Then, the energy density in the wave guide 46 is approximately $2\pi$ times the ratio of the energy required in the cavity divided by Q. The calculated energy in the wave guide can then be easily translated into the output energy requirement for the microwave source at the resonant frequency.

The Q value essentially defines the time constant for the resonant cavity, and thus can further be used to determine how long the microwave source should be pulsed on to assure plasma creation. It can be shown that as a function of time the fraction of energy in the combustor resonant cavity (the liner 14 in this example) is $[1-e^{(-\pi f t/Q)}]$. Accordingly, the power density in the cavity at resonance as a function of time equals the peak power times $[1-e^{(-\pi f t/Q)}]$. Therefore, with sufficient input power generated by the microwave source 44 into the wave guide 46, a pulse duration of $5Q/\pi f$ duration will result in nearly a maximum resonant energy build-up in the combustor 10 to produce a plasma for a given input power level. For example, experiments with a conventional can combustor produced a plasma discharge at less than 400 watts of input power with most of the losses being observed in the transmission lines and with the applied frequency being significantly off resonance. Controlling the applied frequency to closely match a resonant response of the combustor 10 will result in more efficient plasma creation. Preferably, however, the microwave source will produce the microwave energy very close to the resonant frequency, for example, within $\pm f/2Q$ of the resonant frequency. Note that the high peak resonant energy is obtained by the Q amplification even with very modest low level average power required from the microwave source 44. These power levels can be achieved from conventional microwave sources which are capable of very high peak power output for short durations (on the order of microseconds). Average power output can be increased if cooling is provided for the microwave source for example, but this may not always be available in some applications.

The embodiment of FIG. 2 is particularly advantageous in that it permits basically any combustor 10 to be used as a resonant cavity for microwave energy. Since the combustible mixture is delivered directly into the combustor 10, the plasma created by resonant build-up in the combustion chamber 18 can directly ignite the combustible mixture. However, each combustor 10 geometry will exhibit its own microwave resonant responses or signatures, and possibly will operate at a unique resonant frequency. Thus, to provide microwave igniters for a number of different engine designs may require designing a corresponding number of microwave energy sources for each frequency of interest.

In accordance with another aspect of the invention, a microwave igniter can be more standardized by the use of an auxiliary resonant cavity as an adjunct to the main combustor 10. If the same resonator can be used on different engines, the fixed resonant response permits the use of the same microwave energy source 44 therewith. In the exemplary embodiments described herein, this feature of the invention can be realized in at least two ways. The first approach is the use of an auxiliary second combustor that also serves as the resonant cavity to provide, in one embodiment, a flame injector that can be used to light off the main combustible mixture supply in the combustor 10. In a second approach, a resonant cavity is used to provide a plasma, and this plasma is exposed to the combustible mixture, for example, by flowing the combustible mixture into the cavity, or by displacing the plasma from the cavity into the combustion chamber. In the first approach, the resonant cavity includes an inlet for air and a combustible mixture, which for convenience can be (though it need not be) the same combustible mixture as used in the main combustor 10.

With reference to FIG. 5, there is illustrated an embodiment of the microwave igniter and flame injector concept. In this drawing, the details of the combustor 10 and various elements such as the fuel nozzle 16 are designated with the same reference numerals since these items can be the same as for the embodiment in FIG. 2, and a repeat description is not required.

In this embodiment, the flame injector is generally indicated with the numeral 70. The flame injector is used to produce a flame or plasma, represented by the shaded region 72, that is injected into the combustor 10 to ignite the main combustible mixture 24. Many advantages follow from this configuration including the fact that the ignition plasma does not have to be produced inside the combustor 10. This avoids contact of the plasma with the walls of the combustor. Additionally, the resonant cavity used for the flame injector 70 can be the same for engine to engine (within engine constraints for envelope size and so forth), with the cavities exhibiting essentially the same natural resonance signature. This permits a single microwave source 44 at a resonant frequency response of the injector 70 to be used for many engines. Still further, because the injector 70 produces a flame of combusting fuel, the flame is stable and can be injected into the combustion chamber 18 to the optimum ignition region of the main combustible mixture 24, as represented in FIG. 5.

The flame injector 70 includes a structural body 74 which for convenience can be a metallized cylindrical can, such as made of stainless steel or hastalloy or other suitable material reflective to microwave energy. The can 74 functions as both a combustor and as a resonant cavity for the microwave energy, analogous to the use of the combustor 10 itself as a resonant cavity but simply on a smaller scale. Thus, the can 74 will exhibit a number of natural resonant frequency responses for microwave energy, and the same analytical process described hereinbefore can be used to determine the desired resonant frequency and power requirements for the microwave source 44.

A wave guide 46 is provided to couple the microwave energy to the can 74. The wave guide 46 can be welded to the can 74 or connected by other suitable means, so as to position the emitter 76 at an appropriate location for resonant response. In this embodiment, the emitter 7 is realized in the form of a slit type iris coupler 76. Of course, a loop antenna emitter or other suitable emitter could alternatively be used for a coaxial cable transmission device as was explained hereinbefore. An extension 34a of the fuel line 34 is used to deliver a small quantity of fuel to the injector 70.

Fuel delivery to the injector 70 can conveniently be separately metered if so desired so that the ignition flame 72 is generated before the main fuel delivery through the fuel nozzle 16 is actuated. The fuel line 34a is connected in a conventional manner to a fuel nozzle or other atomizing device 34c in this exemplary case of using a liquid fuel (which could simply be a restriction or orifice at the end of the fuel line) to produce a fuel spray 78 inside the can 74. Air holes 54 are provided in the can to permit air from the plenum 11 to pass into the can, mix with the fuel spray 78 and also pass down through into the combustion chamber 18 as represented by the arrows 80.

When ignition is to commence, fuel is delivered to the combustor/resonator can 74 and mixes with the air 80 to form a combustible mixture in the can. Microwave energy is supplied from the source 44 down the wave guide 46 and is emitted into the can 74 by the antenna emitter 76. The flame injector can 74 functions as a resonant cavity for the microwave energy resulting in an intense electric field near the center axis of the can 74. This intense electric field creates a plasma 82 in free space in the gas (e.g. air) in the can 74. In a manner similar to the embodiment of FIG. 2, the plasma ball 82 is produced downstream of the air/fuel mixture in the can 74 and in a non-contact relationship with the microwave emitter 76, and depending on the particular design of the can 74, also spaced in a non-contact manner from the can 74 wall structure. This plasma 82 ignites the combustible mixture in the combustor can 74 to produce the flame 72. The air pressure, fuel pressure and thermal gradients force the flame 72 out of the injector 70 and into the combustion chamber 18 into contact with the main combustible mixture 24 to ignite the same. Note that the can 74 can be small enough to fit axially into a preexisting spark plug hole 56. The can 74 can be mounted to the fan casing 11 or other suitable support such as by welding 84, a threaded engagement or other suitable mechanism. The air holes 54 can easily be sized so as to not permit the loss of microwave energy from the combustor/resonator 74.

In an alternative embodiment, it will be appreciated from FIG. 5 that the fuel supply 78 to the injector 70 can be omitted if so desired for a particular application. In this case, the can 74 serves as a resonant cavity for the microwave energy, and the plasma 82 so produced can be injected into the combustion chamber 18 under motive force of both the inherent pressure and thermal gradients associated with the plasma as well as the air velocity from the air flow through the air holes 54. The plasma 82 can be injected into the combustion chamber 18 so as to ignite the combustible mixture 24 near the wall of the combustor 10, much in the same manner as a conventional spark plug would if it were installed in its normal position in the hole 56; or the plasma 82 can be injected further into the combustion chamber 18 away from the combustor liner 14 if so desired.

Figure 6:
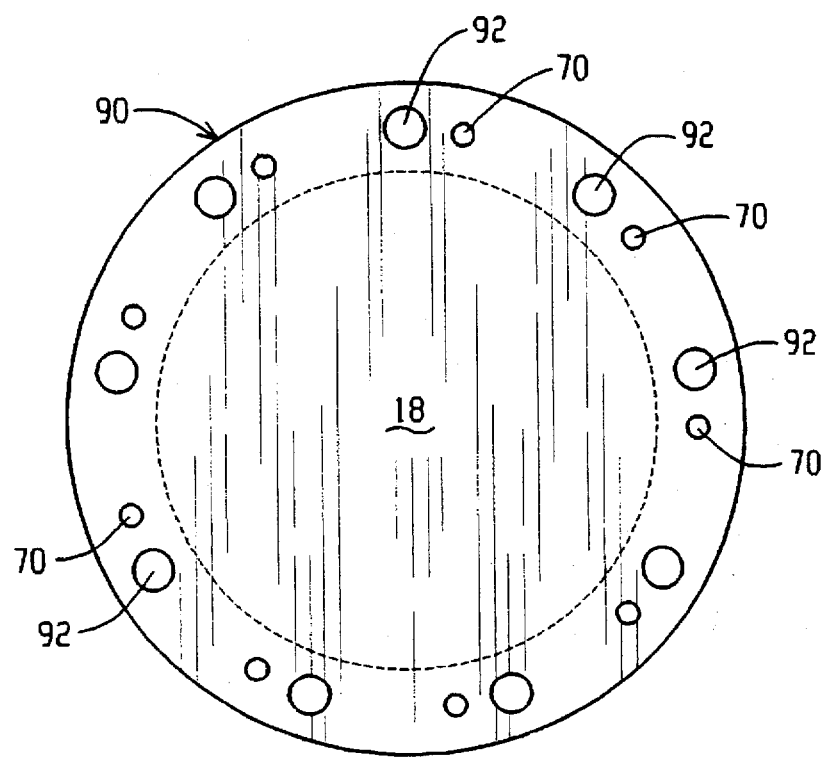
FIG. 6 is an end view of an annular combustor illustrating placement of a number of fuel nozzles and flame injectors according to the invention.

Although in the embodiment of FIG. 5 the flame injector 70 is shown disposed in the existing spark plug hole 56 generally transverse the main fuel nozzle 16, this is merely for convenience and description and not a requirement. The flame injector could be positioned elsewhere at an opening to the combustor 10, such as for example adjacent the nozzle 16. Such an arrangement would be particularly useful with an annular combustor, an end view of which is shown in FIG. 6. An annular combustor is somewhat toroidal in shape, but typically has a number of fuel nozzles 92 disposed about its circumference. By placing a flame injector 70 as described in FIG. 5 adjacent each or some of the nozzles 92, ignition can be initiated. If so desired, the primary orifices (not shown) of the main nozzles 92 can be omitted since the flame injectors 70 will provide the ignition flame, thus simplifying the nozzle design. Furthermore, in some applications a single flame injector could be disposed between adjacent nozzles 92 so that one injector 70 is used to ignite fuel from the two nozzles, thus reducing the number of flame injectors. Other combinations of nozzles and flame injectors will be apparent to those skilled in the art based on these examples.

Figure 7:
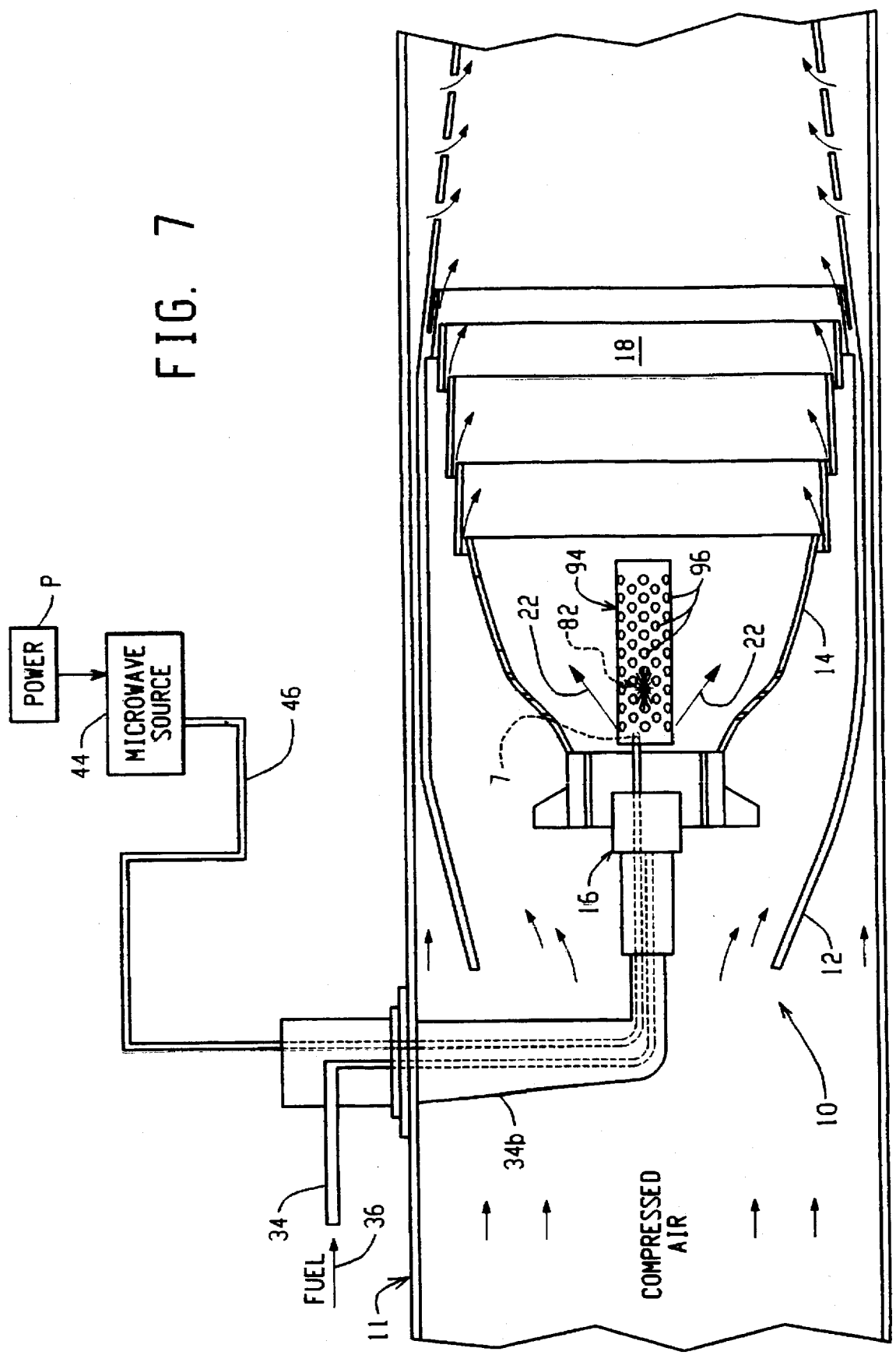

With reference to FIG. 7, another embodiment of the invention is illustrated. Again, like components previously described herein are designated with the same reference numeral without repeat description. In this version, a resonator cavity realized in the form of a metallized can 94 is disposed just forward of the fuel nozzle assembly 16. For clarity, the fuel spray 24 is omitted from the drawing, but the spray directional arrows 22 are indicated for reference. The can 94 is highly perforated with a number of holes 96 that are appropriately sized so that microwave energy does not pass through the holes 96. The can 94 functions as a resonant cavity for microwave energy emitted into the can from the source 44 at a frequency within a resonant response of the can 94. The holes 96 are provided to permit the combustible mixture of fuel and air to pass into the can 94 into contact with the plasma ball created by the resonance of the microwave energy therein.

The microwave energy is transmitted to the can 94 via a wave guide 46, and it will be appreciated that the wave guide 46 can be of conventional design such as a hollow tube or alternatively a coaxial cable could be used. The wave guide 46 can conveniently be routed down through the fuel line housing 34b with the emitter 7 disposed at an opening to the can 94. As described hereinbefore, the emitter 7 can be an iris coupler, a loop antenna or other suitable microwave emitter matched to the selected microwave transmitter device. The microwave energy is emitted into the can 94 at a resonant frequency to produce a plasma ball which ignites the combustible mixture in the combustion chamber 18.

Although not directly illustrated in FIG. 7, a convenient alternative embodiment is to use the wave guide 46 itself as the fuel supply to the combustor 10. For example, in the case of an iris coupler, the slit 58 can be sized small enough to permit pressure or air blast atomization of the fuel, and so disposed near air blast orifices and swirlers that can assist in the atomization. Fuel is delivered into the wave guide 46 through an opening appropriately sized so that microwave energy does not escape therethrough. The fuel is transparent to the microwave energy and therefore the fuel and microwaves can be coupled into the combustor 10 via the wave guide 46. This can eliminate the need for a separate fuel nozzle assembly 16 in the embodiment of FIG. 7. As a further alternative embodiment, an existing fuel line can be used as a microwave wave guide, with the nozzle 16 orifice functioning as a slit wave guide emitter 7. In this case, conventional microwave screens can be provided in the fuel lines to prevent microwave energy from passing back to the fuel source.

In still a further embodiment with reference to FIG. 8, the can 94 of FIG. 7 is disposed along the inner liner 14 of the combustor 10, but within the fan casing 11 air plenum, such as between the inner liner 14 and the outer liner 12, or between the combustor 10 and the fan casing 11. The wave guide 46 is routed into the combustor 10 with the emitter 7 (such as an iris coupler or antenna, for example) disposed at an appropriate opening to the can 94. Air enters the can 94 at the wave guide open end of the can. The wall structure of the can 94 adjacent the combustion chamber 18 is provided with a number of holes 96 so that the plasma 82 is displaced by the air flowing through the can 94 into the combustion chamber 18 to ignite the combustible mixture therein. In this embodiment, the distal end of the can opposite the emitter 7 would be capped so that the plasma ball 82 remained in the can and not forced axially out of the can by air pressure. As with the previously described embodiments, the can 94 serves as a resonant cavity for the microwave energy to build up an intense electric field in the free space of the can 94, preferably not in contact with the can 94 wall, and spaced from the emitter 7. The electric field causes a breakdown of the air and a plasma is produced. Those skilled in the art will readily appreciate that the shaded region 24 representing the combustible mixture is provided for clarity and ease of explanation, but that in an actual combustor the combustible mixture will circulate to the walls of the combustor 10 liner 14 (as is typical with spark plug igniters, for example). In the embodiment of FIG. 8, the can 94 is preferably formed integrally with the inner liner 14—that is, the can wall structure forms part of the liner 14. Relative dimensions in FIG. 8 are exaggerated for clarity. The spark plug hole 56 can be omitted if so desired.

In FIG. 8 it will be appreciated that the position of the can 94 is exemplary. If so desired for effective ignition, the can 94 can be disposed elsewhere along the combustion chamber 18 wall structure (i.e. the liner 14). For example, it may be desirable to place the can 94 axially closer to the primary zone 20, such as near where the spark plug hole typically is located. In any case, the spark plug hole can be removed.

Figure 9A:
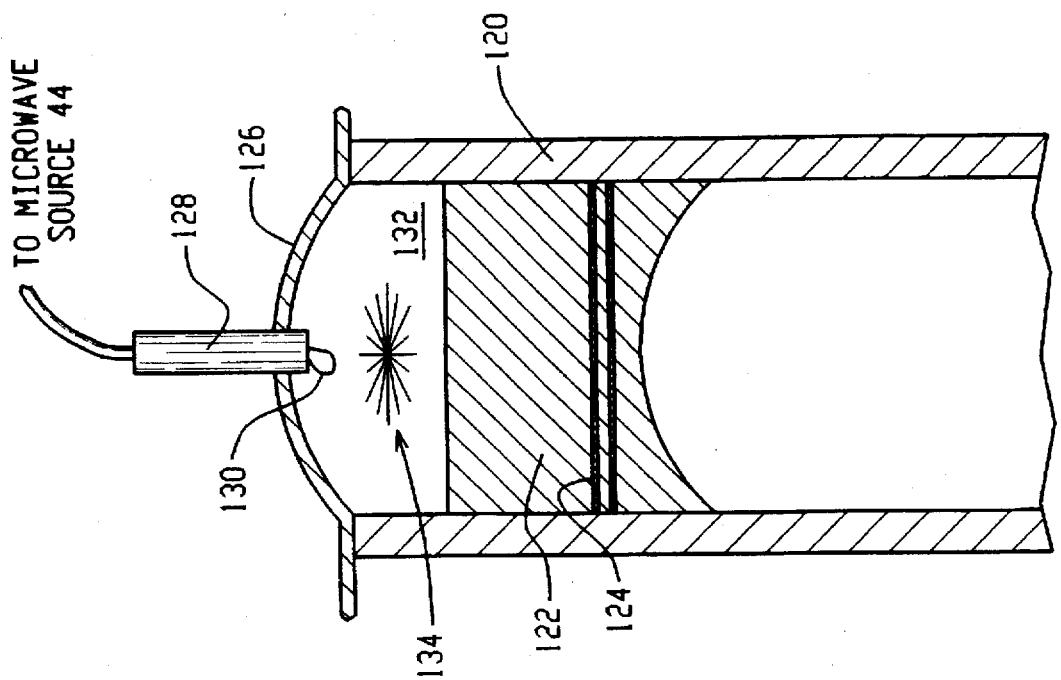
FIGS. 9A and 9B are schematics for another embodiment of the invention as applied to a reciprocating engine, for example.
Figure 9B:
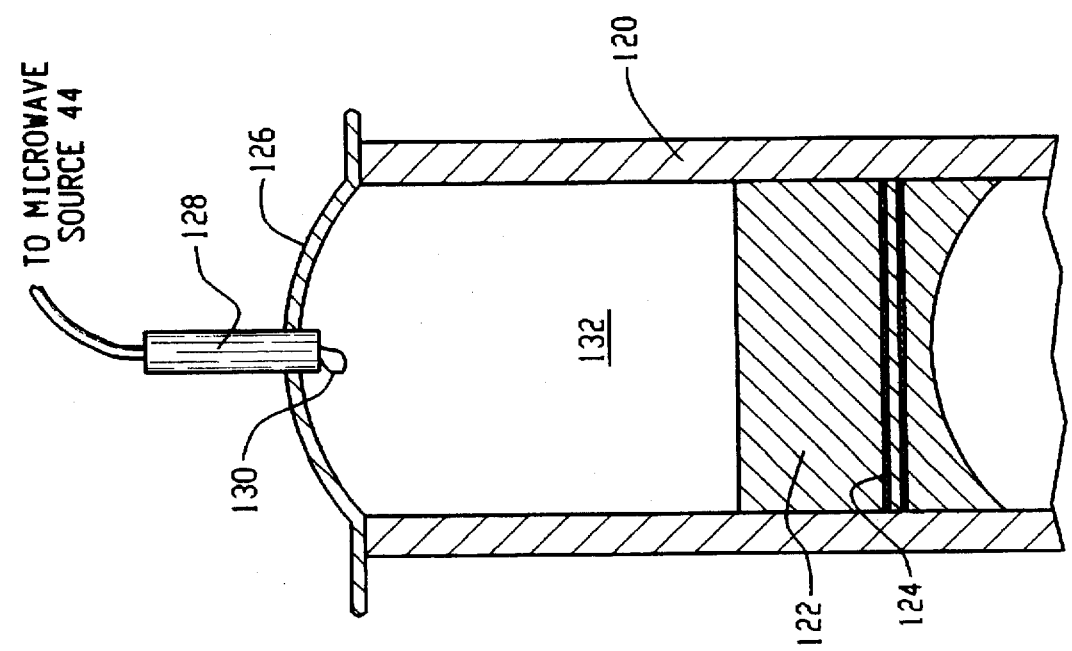

The preceding embodiments were directed to combustors and resonant cavities that have a geometry that remains relatively the same during a combustion cycle. The invention, however, finds application for reciprocating engines in which a combustor (e.g. a piston cylinder) changes volume during a combustion cycle. An embodiment of this aspect of the invention is illustrated in FIGS. 9A and 9B. In FIG. 9A, there is illustrated a piston cylinder 120 enclosing a piston 122 and seal 124 in a conventional design. The position of the piston 122 in FIG. 9A is typical for the exhaust or expanded phase of the combustion cycle in which the piston 122 is displaced axially from the cylinder head 126. A microwave transmitter such as a coaxial cable 128 is disposed in place of a conventional spark plug, with an emitter such as a loop antenna 130 disposed inside or at an opening to the cylinder 120. The combustion chamber 132 defined by the cylinder 120 and piston 122 varies in volume with the piston position. On the return stroke, represented in FIG. 9B, the combustion chamber volume decreases until it reaches a size at which resonance occurs for the emitted microwave energy. This causes a plasma 134 to be created in a manner similar to the techniques previously described herein. The combustor 120 can be characterized for the appropriate mode, Q, resonant frequency and so forth to produce a plasma at the appropriate return position of the piston.

The invention thus provides an ignition system for a combustor which utilizes the combustor as a microwave resonant cavity to produce a plasma to ignite a combustible mixture therein, for designs in which the combustion chamber has a fixed or changing geometry during a combustion cycle. The invention also contemplates a microwave igniter in the form of microwave resonant cavity used to produce a plasma that is injected into or exposed to a combustible mixture in a combustor, thus allowing for a separate structure with a fixed resonant response to be used with different engines and combustors. The invention also provides a combined microwave igniter and flame injector in which a combustor functions as a microwave resonant cavity to produce a plasma which ignites a combustible mixture in the cavity to produce a flame that is injected into a second combustor having a main combustible mixture therein to be ignited by the injected flame.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. Ignition apparatus comprising: a combustor; means for supplying a combustible mixture into said combustor; a body defining a resonator cavity therein; and a microwave energy source including a microwave emitter for emitting microwave energy into the cavity at a frequency within a resonant response of the cavity to produce a plasma in free space in the cavity; said body having at least one opening therein that permits the plasma to be exposed to the combustible mixture of the combustor for ignition thereof.

2. The apparatus of claim 1 wherein said body is disposed within the combustor in a region exposed to the combustible mixture.

3. The apparatus of claim 2 wherein said supplying means comprises a fuel nozzle, said body being disposed forward of a nozzle spray outlet.

4. The apparatus of claim 2 wherein said body comprises a number of holes through which the combustible mixture passes into the cavity and is ignited by said plasma.

5. The apparatus of claim 1 wherein the combustor comprises a combustion chamber defined by a combustor wall, said body being integrally formed as part of said wall with said cavity being disposed exterior the combustion chamber.

6. The apparatus of claim 5 wherein said body and combustor comprise a common wall section with openings therethrough so that the plasma in said cavity passes through said openings and ignites said combustible mixture in said combustion chamber.

7. The apparatus of claim 1 wherein said source comprises a microwave wave guide coupled at one end to said microwave emitter, said emitter being disposed at an opening to said cavity.

8. The apparatus of claim 7 wherein said emitter comprises an iris coupler.

9. The apparatus of claim 1 wherein said body comprises a can that operates as a resonator cavity for microwave energy for a number of different combustor geometries.

10. The apparatus of claim 1 wherein said plasma is produced at a position within said cavity and spaced from a cavity reflective surface.

11. The apparatus of claim 1 wherein said plasma is produced at a position spaced from said microwave emitter.

12. The apparatus of claim 1 wherein said plasma is produced substantially free from contact with said body and said emitter.

13. An ignition method comprising:

a. providing a combustible mixture in a combustion chamber of a combustor;

b. providing a body as a microwave resonator cavity;

c. producing microwave energy and emitting said energy into the cavity at a frequency within a resonant response of the cavity; and d. using resonant microwave energy in the cavity to produce a plasma, in free space within the cavity, that ignites said combustible mixture in the combustion chamber.

14. The method of claim 13 further comprising the step of disposing the body within the combustor and having the combustible mixture enter the resonant cavity and be ignited by said plasma.

15. The method of claim 13 further comprising the step of disposing the body adjacent the combustor with openings therebetween, and having the plasma exit the resonant cavity through said openings and igniting said combustible mixture.

* * * * *